United States Patent [19]

Buynak et al.

[11] Patent Number: 5,394,470
[45] Date of Patent: Feb. 28, 1995

[54] HORIZONTAL PULSE AUGMENTATION OF A VIDEO SIGNAL

[75] Inventors: William J. Buynak, Bayville; Eugene Leonard, Sands Point, both of N.Y.; Graham S. Stubbs, Poway, Calif.; Karoly Budai, Danbury, Conn.

[73] Assignee: Eidak Corporation, Hyannis, Mass.

[21] Appl. No.: 50,563

[22] Filed: Apr. 20, 1993

Related U.S. Application Data

[63] Continuation-in-part of Ser. No. 934,777, Aug. 24, 1992, abandoned.

[51] Int. Cl.$^6$ ............................................. H04N 7/167
[52] U.S. Cl. .................................................. 380/5; 380/15
[58] Field of Search ..................................... 380/5, 14, 15

[56] References Cited

U.S. PATENT DOCUMENTS

| | | |
|---|---|---|
| 3,184,537 | 5/1965 | Court et al. . |
| 3,313,880 | 4/1967 | Bass . |
| 3,564,141 | 12/1969 | Hurst . |
| 4,100,575 | 7/1978 | Morio et al. . |
| 4,163,253 | 7/1979 | Morio et al. . |
| 4,170,026 | 10/1979 | Nagaoka et al. . |
| 4,475,129 | 10/1984 | Kagota . |
| 4,488,183 | 12/1984 | Kinjo . |
| 4,631,603 | 12/1986 | Ryan . |
| 4,644,399 | 2/1987 | McCord et al. . |
| 4,695,901 | 9/1987 | Ryan ........................ 380/5 |
| 4,783,699 | 11/1988 | DePaul . |
| 4,819,098 | 4/1989 | Ryan . |
| 4,829,377 | 5/1989 | Becker et al. . |
| 4,907,093 | 3/1990 | Ryan . |
| 4,962,529 | 10/1990 | Saeki et al. ............... 380/15 |
| 5,034,981 | 7/1991 | Leonard et al. ........... 380/5 |

FOREIGN PATENT DOCUMENTS

| | | |
|---|---|---|
| 57-28485 | 2/1982 | Japan . |
| 57-192182 | 11/1982 | Japan . |
| 60-177470 | 9/1985 | Japan . |
| 62-235885 | 10/1987 | Japan . |

*Primary Examiner*—Stephen C. Buczinski
*Attorney, Agent, or Firm*—Curtis, Morris & Safford

[57] ABSTRACT

Augmenting pulses are added to the horizontal sync pulse intervals of a video signal to prevent a copy of the thus modified video signal from being satisfactorily displayed. The magnitude of the augmenting pulses is chosen so that the modified signal containing these pulses can be displayed without distortion. When the modified video signal is recorded and then reproduced by a typical VCR (i.e., when the modified video signal is copied), attenuation of the augmenting pulses and the remaining portions of the horizontal sync pulse occurs so that a television receiver cannot properly detect horizontal sync in the copied modified video signal, resulting in an unsatisfactory display.

48 Claims, 7 Drawing Sheets

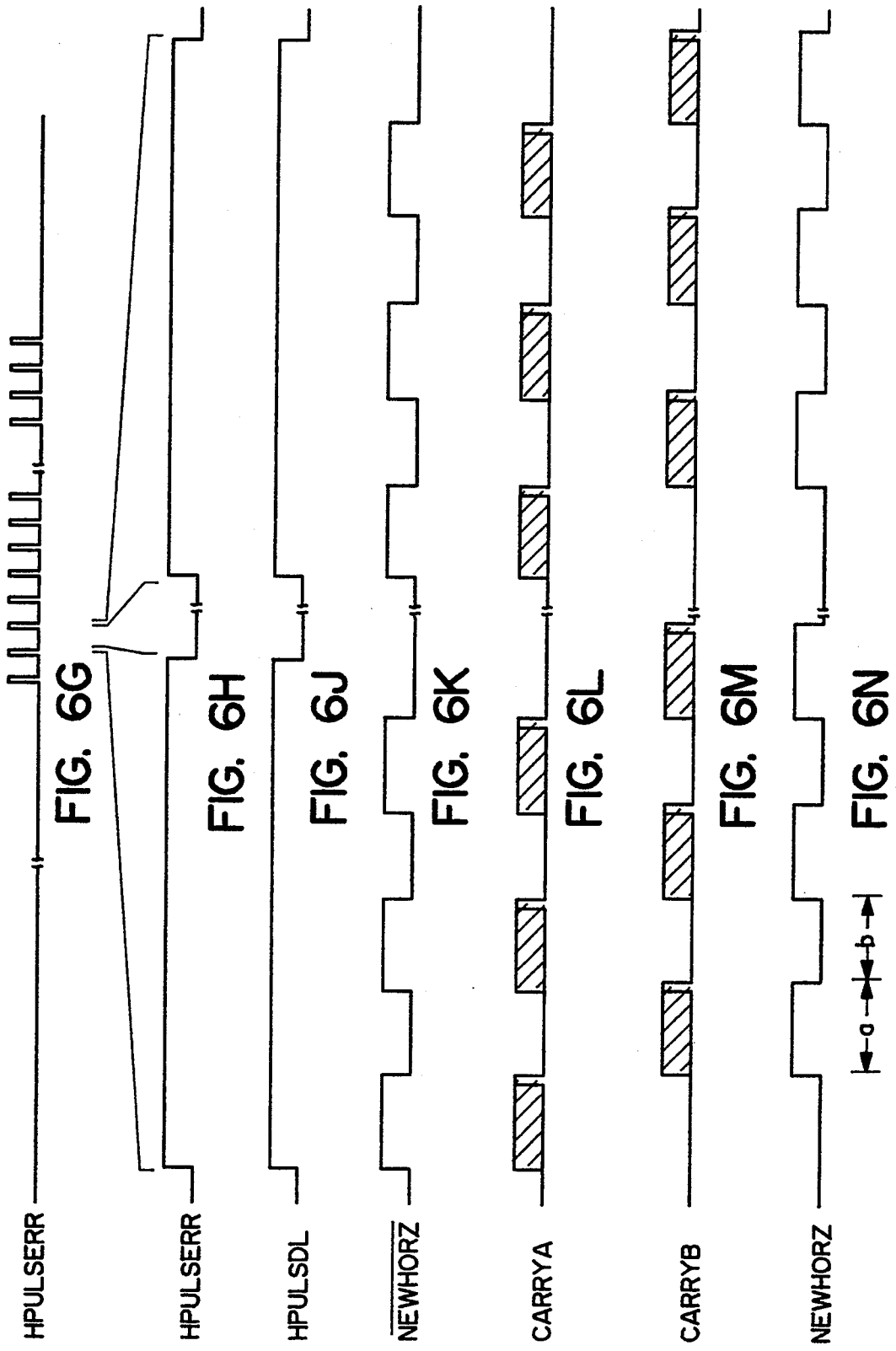

HORIZONTAL PULSE AUGMENTATION OF A VIDEO SIGNAL

RELATED APPLICATIONS

This application is a continuation-in-part of application Ser. No. 07/934,777, filed Aug. 24, 1992, now abandoned.

BACKGROUND OF THE INVENTION

This invention relates to a method and apparatus for copy protection of a video signal. More particularly, the present invention relates to modifying a video signal so it can be satisfactorily displayed on a receiver, while recorded copies of the modified video signal cannot be satisfactorily displayed.

A video signal may be in a format according to one of several standards. The standard conventionally used in the United States is the NTSC standard, which specifies that a field of information is transmitted every 1/60 of a second and each field is organized into 262.5 lines of information. A frame consists of two fields. The first 20 lines of each field are referred to as the vertical blanking interval, and are devoid of video information. The first three line intervals of the vertical blanking interval contain a standard sequence of pulses used for vertical synchronization, namely, a sequence of equalizing pulses in lines 1–3, followed by a sequence of vertical sync pulses in lines 4–6, followed by another sequence of equalizing pulses in lines 7–9, thereby indicating the start of a field. Lines 10–20 each contain a horizontal blanking interval and are otherwise devoid of information. The remaining so-called active lines in each field contain useful video information, that is, information to be displayed on a television receiver. As is conventional, the active line intervals begin with a horizontal blanking interval, and this blanking interval is followed by a waveform to be displayed which represents a line of an image. The horizontal blanking interval is also referred to herein as the horizontal synchronizing interval.

As can be seen from FIG. 1, the horizontal blanking interval includes a waveform portion having an amplitude of 0 IRE units, referred to as a "front porch", followed by a waveform portion having an amplitude of −40 IRE units, referred to as a horizontal sync pulse. The horizontal sync pulse is followed by another waveform portion having an amplitude of 0 IRE units, referred to as a "breezeway", and the last portions of the horizontal blanking interval are the color burst, and the color back porch.

The prior art includes techniques for modifying a video signal so it can be satisfactorily displayed on a receiver, while recorded copies of the modified video signal cannot be satisfactorily displayed.

One such technique adds a large amplitude pulse to the back porch of the horizontal blanking interval. A variation of this technique alternately adds one of two pulses to the back porch. These pulses are eliminated by a chroma signal filter in a television, but impair the operation of the automatic gain control (AGC) circuit in a videocassette recorder (VCR) so that the signal recorded by the VCR cannot be satisfactorily displayed.

Another such technique adds an interference signal including a narrow positive pulse near the leading edge of the horizontal sync pulse, and a negative pulse of approximately equal area to the front porch. The interference signal interferes with successful color phase restoration on playback of a copy of a video signal which includes the interference signal.

However, none of these techniques has been found to result in a displayed copy of the video signal which is sufficiently unsatisfactory. Further, none of these techniques modifies a video signal so as to prevent detection of its horizontal sync pulses during display of a copy of the modified video signal.

OBJECTS AND SUMMARY OF THE INVENTION

Therefore, one object of the present invention is to provide a technique for copy protecting a video signal which avoids the aforementioned disadvantages of the prior art.

Another object of the present invention is to provide a method and apparatus for copy protecting a video signal so that the video signal can be satisfactorily displayed, while recorded copies of the copy protected video signal cannot be satisfactorily displayed.

A further object of the present invention is to provide a method and apparatus for modifying a video signal so as to prevent detection of the horizontal sync pulses included in a copy of the modified video signal.

A still further object of the present invention is to provide a method and apparatus for copy protecting a video signal which is broadcast.

A yet further object of the present invention is to provide a method and apparatus for copy protecting a video signal which is recorded on a recording medium.

In accordance with an aspect of the present invention, a video signal is provided which includes field intervals of video information and synchronizing intervals having a signal therein with a predetermined magnitude. A plurality of augmenting pulses having a magnitude substantially greater than the predetermined magnitude is added to at least one of the synchronizing intervals in each of the field intervals in the video signal to produce a modified video signal which can be displayed with an absence of distortion due to the presence of the augmenting pulses.

BRIEF DESCRIPTION OF THE DRAWINGS

The following detailed description, given by way of example and not intended to limit the present invention solely to the embodiments shown and described herein, will best be understood in conjunction with the following drawings in which.

DETAILED DESCRIPTION OF THE PREFERRED EMBODIMENTS

In a preferred embodiment, the present invention resides in the addition to the horizontal sync pulses in the video information lines in a video signal of a plurality of augmenting pulses having a relatively large magnitude. The repetition rate and duration of these augmenting pulses are such that, because of the relatively poor high frequency response of a videocassette recorder (VCR), the VCR attenuates the augmenting pulses and the remaining portions of the horizontal sync pulses during record/playback. Due to the attenuation of the remaining portions of each horizontal sync pulse, the copied (i.e., recorded) modified video signal is unsatisfactorily displayed on a television receiver.

Figure 2:
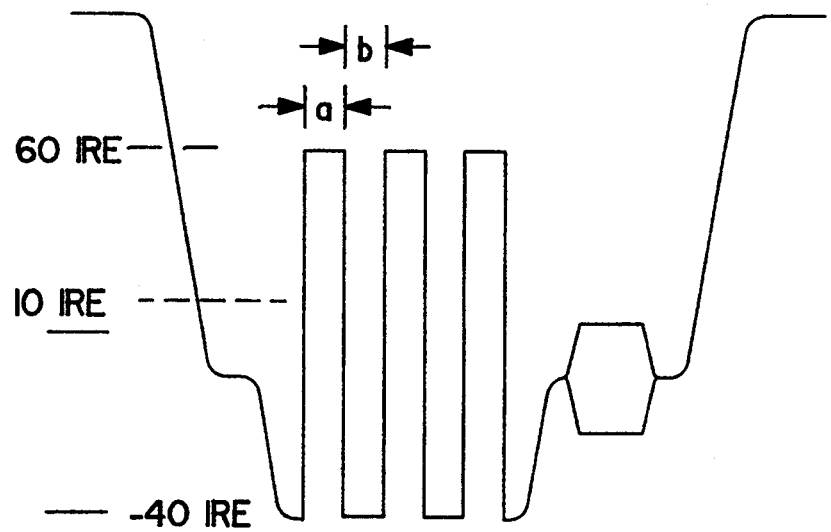
FIG. 2 illustrates a horizontal sync portion of a modified video signal waveform including augmenting pulses.

FIG. 2 shows an example of a horizontal blanking interval portion of a video signal including three augmenting pulses added to the horizontal sync pulse. The waveform of FIG. 2 is referred to hereinafter as the "legitimate" signal because, when supplied to a conventional television receiver, it is satisfactorily displayed. Each augmenting pulse has an amplitude of 100 IRE units peak-to-peak, that is, a magnitude of 100 IRE units in the positive direction before addition to the horizontal sync pulse of a video signal, After addition, the modified signal has a negative peak amplitude of −40 IRE units and a positive peak amplitude of approximately 60 IRE units, and a duration shown as "a" in FIG. 2. The interval between pulses has a duration "b". In FIG. 2, the durations "a" and "b" are approximately equal, resulting in a duty cycle of about 50%, where the duty cycle is defined as $$a/(a+b).$$

The durations "a" and "b" each have a value of about 0.75 microseconds, since there are six such durations in each 4.7 microsecond horizontal sync pulse interval. Therefore, the average amplitude during the horizontal sync pulse interval, approximately 10 IRE units, is simply the average of the positive and negative amplitudes of the augmenting pulses.

It has been found that when the modified video signal is displayed on a television receiver, the augmenting pulses experience attenuation due to the horizontal sync circuitry of that receiver. When this modified video signal is recorded on a typical consumer VCR, the augmenting pulses are further attenuated and, when that recorded modified signal is reproduced for display on a television receiver, the augmenting pulses are still further attenuated. The average amplitude during each horizontal sync pulse interval is unchanged, and the remaining originally negative portions of each horizontal sync pulse are correspondingly attenuated.

It is believed that the majority of the attenuation in the VCR is due to the limited frequency response in the record/play back operation of a typical consumer VCR. Since the frequency response of a typical television receiver is better than that of a typical VCR, a receiver can satisfactorily display a legitimate signal whereas a VCR cannot satisfactorily record and play back the legitimate signal for adequate display.

Another difference between the receiver and VCR involves the complexity with which sync and color burst are treated. The VCR is quite complex compared to the receiver. The mechanical characteristics of the tape transport, plus tape stretch and frequency limitations, result in jitter and errors in the phase rotated 629 kHz (down converted) playback color information reproduced from the tape. A significant amount of circuitry is used to recreate the stable 3.58 MHz required by the receiver. Appropriate timing and placement of the augmenting pulses inhibits proper correction of the playback signals causing incorrect color, or the absence of color, in the displayed playback signal.

Figure 1:
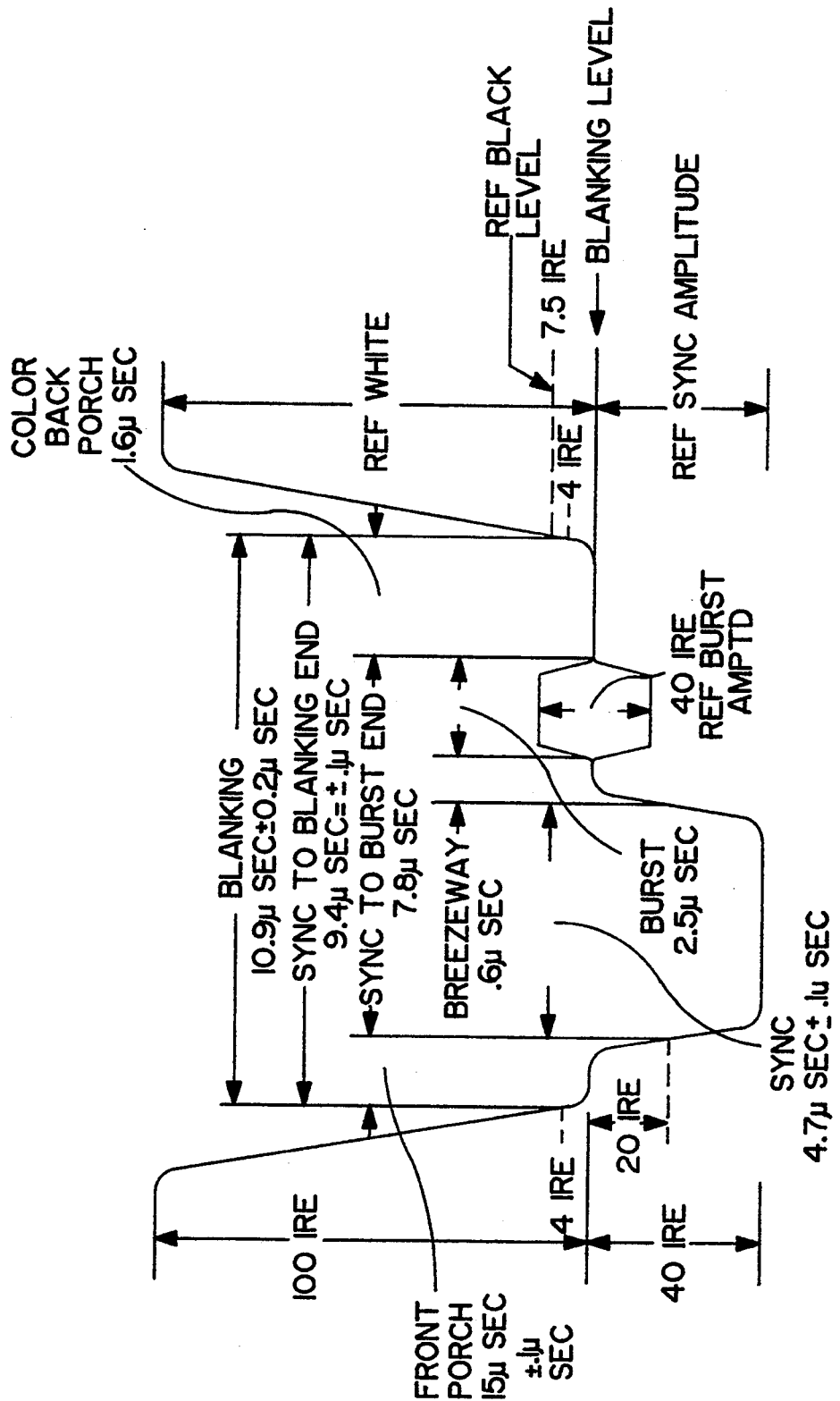
FIG. 1 illustrates a horizontal blanking interval of a conventional video signal waveform.
Figure 3:
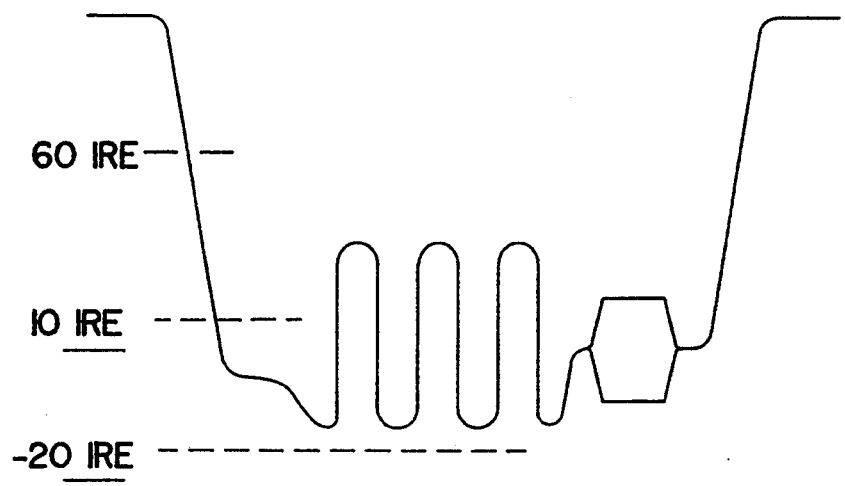
FIG. 3 illustrates a waveform of a reproduced copy of the modified video signal shown in FIG. 2.

FIG. 3 shows the resultant attenuation of the waveform of FIG. 2 after the legitimate signal is recorded and reproduced. The waveform of FIG. 3 is referred to hereinafter as the "pirated" signal because it is assumed that this waveform results from the unauthorized copying of the legitimate signal. It has been found that the attenuation experienced by the augmenting pulses in the VCR relative to the average value of the horizontal sync pulse interval is about 50%, that is, the average value of the horizontal sync pulse is unchanged (remaining at about 10 IRE units), but the amplitude range of the augmenting pulses superimposed onto the horizontal sync pulse is reduced by about half. Thus, the augmenting pulses in the pirated signal extend from a minimum (or negative) amplitude of 10 IRE units−(0.5)(60−10 IRE units)=−15 IRE units to a maximum (or positive) amplitude of 10 IRE units+(0.5)(60−10 IRE units)=35 IRE units A television receiver typically interprets a pulse having a negative magnitude below −20 IRE units and at least a certain duration as a horizontal sync pulse. In particular, most television receivers sense the initial negative-going portion of each horizontal sync pulse, such as that which follows the front porch shown in FIG. 1. However, the negative peak magnitude of the waveform of FIG. 3 is greater (less negative) than −20 IRE units, so a typical television receiver fails to detect a horizontal sync pulse for this waveform and loses horizontal synchronization. Consequently, the display of the FIG. 3 waveform on a receiver is unsatisfactory. Specifically, it has been found that receivers display misaligned vertical lines, and fail to detect color bursts, resulting in incorrect display of color for the corresponding lines. Furthermore, some loss of automatic gain control (AGC) has been observed on television receivers from certain manufacturers. Thus, due to these effects, the video signal including augmenting pulses is copy protected.

In the preferred embodiment, augmenting pulses are not added to the first twenty-three lines of a field or to those lines following the 255th line in a field so that vertical synchronization is not affected. Also, some cable scrambling systems or closed caption systems use at least some of these lines for other information and it is preferred not to interfere with such use.

The effects of variations in the augmenting pulses were explored through tests on VCRs and television receivers from several manufacturers. These tests are presented in Tables 1 and 2.

In each test, augmenting pulses in a particular pattern were added to the horizontal sync pulse intervals of lines 24–255 of each field. The magnitude of the augmenting pulses was adjusted to be the largest value which did not interfere with display of the legitimate signal, that is, the signal containing the augmenting pulses, on the variety of television receivers tested. It was found that, when the magnitude of the augmenting pulses is substantially larger than the magnitude of the horizontal sync pulse, distortion in the pirated signal is sufficient to adequately copy protect the video signal. Generally, the magnitude of the amplitude of the augmenting pulses was constrained by the capability of the lower price receivers to the value shown in Tables 1 and 2.

Then, the signal containing the augmenting pulses was recorded and played back by VCRs from many manufacturers. The pirated signal, that is, the playback signal, was rated on a scale of 0–2 as follows:

0=no distortion, that is, no copy protection effect
1=some visible distortion on at least one receiver
2=significant distortion on all receivers tested A rating of "1" covers a wide range of distortion effects, from a slight effect on only one manufacturer's equipment to a moderate effect on all equipment tested. Generally, the lower price VCRs reproduced the modified signal the least effectively. In other words, for some patterns, the more expensive VCRs were able to produce a pirated signal exhibiting little distortion while the less expensive VCRs produced a pirated signal exhibiting significant distortion.

Figure 4:
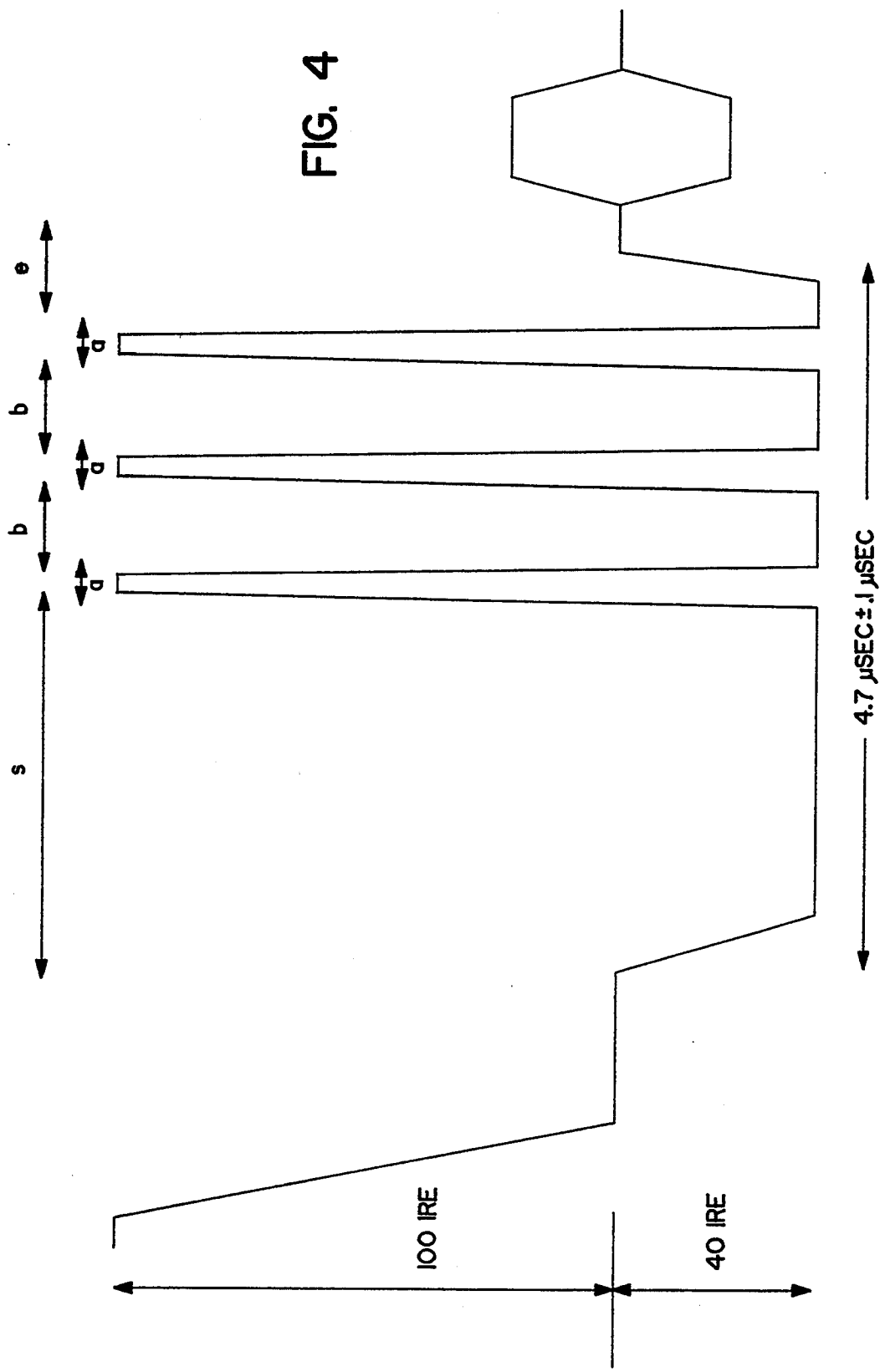
FIG. 4 illustrates another modified video signal waveform including augmenting pulses.

FIG. 4 shows the optimal pattern for augmenting pulses found from the tests presented in Tables 1 and 2. Among the distortions exhibited in a pirated signal based on a legitimate signal having augmenting pulses as shown in FIG. 4 were color loss, color flicker and horizontal jitter.

Table 1 shows the tests performed where all augmenting pulses had the same polarity, either positive or negative, while Table 2 shows the tests performed where augmenting pulses were added in pairs of two pulses, a negative polarity pulse followed by a positive polarity pulse.

In Table 1, the pulse width corresponds to the areas labelled "a" on FIGS. 2 and 4, the spacing between pulses corresponds to the areas labelled "b" on FIGS. 2 and 4, and the start time "s" indicates the offset from the start of the horizontal sync pulse interval. Designating the end portion as "e", that is, the portion between the last augmenting pulse and the end of the horizontal sync pulse interval, and the number of augmenting pulses as "n", the following relationship exists:

$$s+(n)(a)+(n-1)(b)+e=4.7 \ \mu sec$$

The magnitude is the largest pulse magnitude, before addition to the horizontal sync pulse interval, which permits display of the modified signal with an absence of distortion on the receivers tested. For example, for the first case listed in Table 1, a positive augmenting pulse magnitude of 170 IRE units, when added to the horizontal sync pulse interval amplitude of −40 IRE units, results in a modified signal amplitude of 130 IRE units. Similarly, a negative augmenting pulse magnitude of 50 IRE units results in a modified signal amplitude of −90 IRE units.

In Table 2, the pulse width indicates the width of each pulse of the pair of pulses, that is, the width of each negative and positive pulse. Where two numbers are listed, it means the negative and positive pulses had different widths. Spacing indicates the time between pairs of pulses. The amplitude is measured before addition to the horizontal sync pulse interval. For example, an augmenting pulse amplitude of ±80 IRE units, when added to the horizontal sync pulse interval, corresponds to a modified signal having a first augmenting pulse at −120 IRE units, followed by a second augmenting pulse at +40 IRE units.

When many pairs of (negative, positive) pulses are added to the horizontal sync pulse interval, the legitimate signal is not effectively copy-protected, as shown in the bottom portion of Table 2. In other words, to induce significant distortion in the pirated signal, the augmenting pulses must be such that the legitimate signal is also displayed with distortion, which is unacceptable. When the amplitude of the augmenting pulses is kept low enough to permit acceptable display of the legitimate signal, display of the pirated signal is not distorted, hence, the augmenting pulses do not provide effective copy protection.

Generally, as can be seen from Tables 1 and 2, if only positive augmenting pulses are used, the most effective copy protection results from use of three pulses, or use of four or five pulses in the second half of the horizontal sync pulse interval. As can be seen from Table 1, the preferred case, which is also shown in FIG. 4, uses three positive pulses in the second half of the horizontal sync pulse interval. If only negative augmenting pulses are used, three pulses of long duration, i.e., longer than 0.3 $\mu$sec, or more than three pulses, are somewhat effective. When pairs of negative and positive pulses are used, there appears to be a region where television receivers can tolerate a small number of pairs of relatively high amplitude pulses, and pulses added to this region are more effective than pulses added to other regions.

If the most sensitive receivers are eliminated from the test population, then the amplitude of the augmenting pulses can be increased, without harming display of the legitimate signal, so as to further degrade display of the pirated signal. Furthermore, elimination of the most sensitive receivers permits augmenting pulses to be placed in the first half of the horizontal sync pulse without adverse effects on the legitimate signal, and, in some cases, improves the copy protection effect.

TABLE 1

All Pulses of Same Polarity

| no. pulses | (a) width ($\mu$sec) | (b) spacing ($\mu$sec) | (s) start ($\mu$sec) | ampl. (IRE) | effect | ampl. (IRE) | effect |
|---|---|---|---|---|---|---|---|
| 1 | .3 | | 1.0 | 170 | 0 | −50 | 0 |
| 1 | .3 | | 2.3 | 170 | 0 | −70 | 0 |
| 1 | .3 | | 4.6 | 170 | 0 | −80 | 0 |
| 2 | .3 | 1.0 | 2.0 | 170 | 0 | −80 | 0 |
| 2 | .3 | .9 | 2.3 | 170 | 1 | −80 | 0 |
| 3 | .2 | 1.0 | 1.2 | 125 | 1 | −60 | 0 |
| 3 | .3 | .9 | .9 | 120 | 1 | −40 | 0 |
| 3 | .3 | .6 | 2.3 | 140 | 2 | −50 | 0 |
| 3 | .4 | .8 | .8 | 90 | 1 | −60 | 0 |
| 3 | .4 | .6 | 2.3 | 90 | 1 | −40 | 1 |
| 3 | .5 | .8 | .8 | 90 | 1 | −70 | 1 |
| 3 | .5 | .4 | 2.3 | 60 | 1 | −50 | 1 |
| 3 | .6 | .8 | .8 | | | −40 | 1 |
| 3 | .6 | .3 | 2.3 | | | −30 | 0 |
| 3 | .75 | .75 | .2 | 100 | 1 | | |
| 4 | .3 | .6 | .8 | 110 | 0 | −50 | 1 |
| 4 | .3 | .4 | 2.3 | 70 | 1 | −50 | |
| 5 | .3 | .5 | .8 | 90 | 0 | −50 | 1 |
| 5 | .3 | .3 | 2.3 | 70 | 1 | −40 | 1 |
| 6 | .3 | .4 | .8 | 60 | 0 | −40 | 1 |
| 6 | .3 | .3 | 1.7 | 60 | 1 | −40 | 1 |
| 7 | .3 | .3 | .8 | 70 | 0 | −40 | 1 |
| 7 | .2 | .2 | 1.3 | 70 | 0 | −40 | 1 |

TABLE 2

Pairs of Negative and Positive Pulses

| no. pulse pairs | (a) width ($\mu$sec) | (b) spacing ($\mu$sec) | (s) start ($\mu$sec) | ampl. (±IRE) | effect |
|---|---|---|---|---|---|
| 1 | .3 | | 1.0 | 80 | 0 |

TABLE 2-continued

| no. pulse pairs | (a) width (μsec) | (b) spacing (μsec) | (s) start (μsec) | ampl. (+IRE) | effect |
|---|---|---|---|---|---|
| 1 | .3 | | 2.0 | 100 | 1 |
| 1 | .3 | | 3.0 | 100 | 1 |
| 2 | .3 | .6 | 1.0 | 80 | 0 |
| 2 | .3 | 1.0 | 1.0 | 80 | 0 |
| 2 | .3 | 1.0 | 2.3 | 100 | 1 |
| 2 | .3 | .6 | 3.4 | 80 | 0 |
| 3 | .3 | .6 | 1.0 | 80 | 1 |
| 3 | .3 | 1.0 | 1.0 | 60 | 0 |
| 3 | .3 | .6 | 2.0 | 50 | 0 |
| 3 | .3 | .6 | 2.4 | 60 | 0 |
| 3 | .4 | .6 | 2.9 | 60 | 0 |
| 3 | .2–.5 | 1.0 | .9 | 70 | 1 |
| 3 | .2–.5 | .7 | 2.6 | 30 | 0 |
| 3 | .5–.2 | 1.0 | .9 | 50 | 1 |
| 3 | .5–.2 | .7 | 2.6 | 60 | 0 |
| 4 | .3 | 1.0 | 1.0 | 40 | 0 |
| 4 | .3 | .6 | 2.3 | 65 | 0 |
| 5 | .3 | .9 | 1.0 | 40 | 0 |
| 5 | .3 | .6 | 1.7 | 40 | 0 |
| 5 | .2 | .4 | 2.7 | 40 | 0 |
| 6 | .3 | .6 | 1.1 | 40 | 0 |
| 6 | .2 | .4 | 2.3 | 50 | 0 |
| 7 | .3 | .6 | 1.0 | 45 | 0 |
| 7 | .2 | .4 | 1.0 | 50 | 0 |

A pattern of augmenting pulses according to the present invention preserves the portion of the video signal waveform between the front porch and the horizontal sync pulse falling from 0 IRE units to −40 IRE units so as not to degrade the display of a legitimate video signal.

Modifications of the present invention may include varying the relative width and/or duty cycle and/or magnitude and/or direction of the augmenting pulses in one horizontal sync pulse interval. Also, the width and/or duty cycle and/or amplitude and/or number of augmenting pulses in a horizontal sync pulse interval may be changed at predetermined times, such as at periodic intervals or when there is a change in the scene represented by the video signal. Still further, the number of horizontal sync pulses per field to which augmenting pulses are added may be varied, for example, to every other line in lines 241–255.

Figure 5:
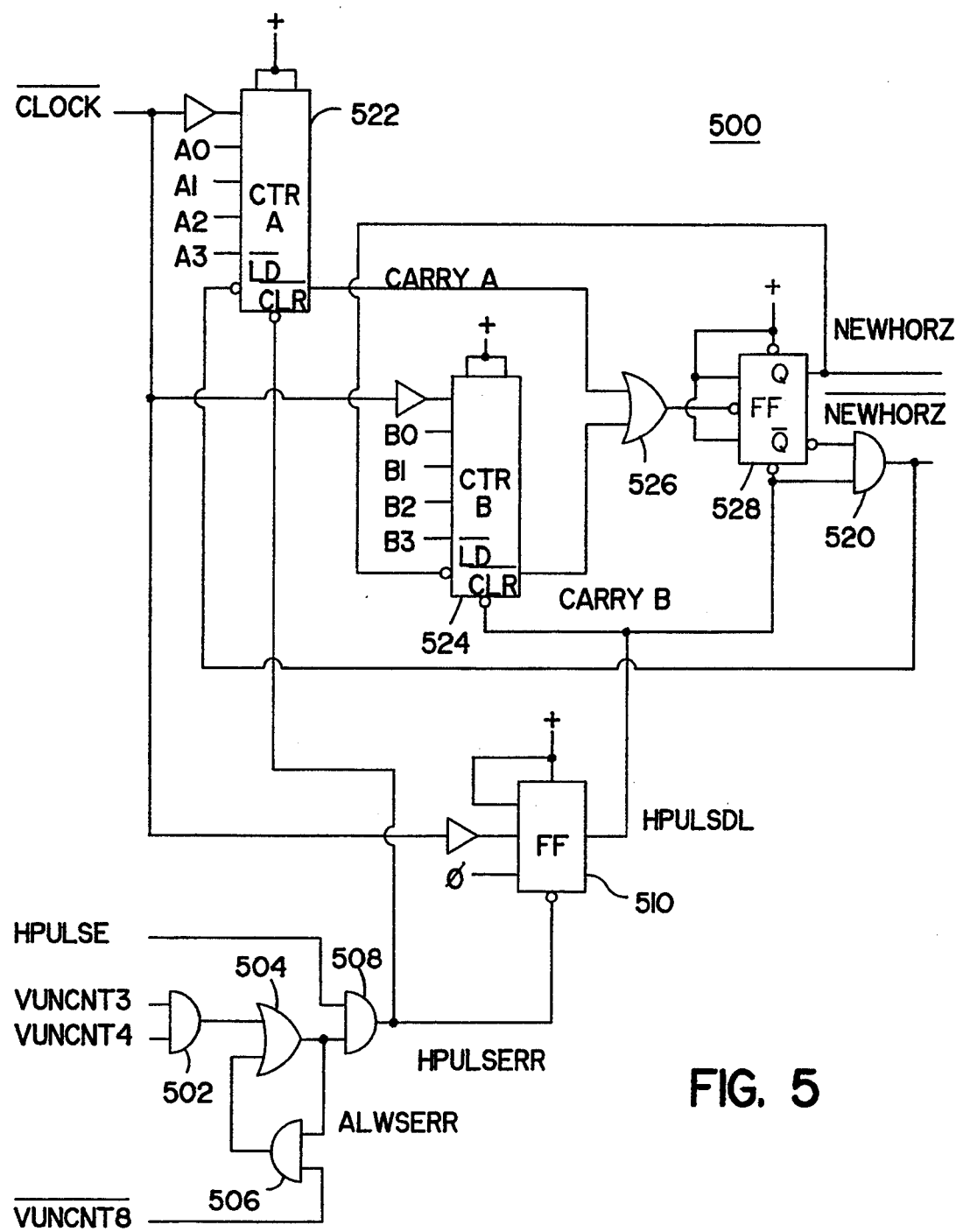
FIG. 5 is a block diagram of a circuit which generates augmenting pulses in accordance with the present invention.

FIG. 5 shows a block diagram of a circuit 500 which generates augmenting pulses during the horizontal sync pulse intervals in each of the 24th through 255th lines (or their equivalent in each field) of a video signal. The circuit in FIG. 5 includes AND gates 502, 506, 508 and 520; OR gates 504 and 526; flip flop circuits (referred to simply as flip flops) 510 and 528; and counters 522 and 524.

Signals VUNCNT3 and VUNCNT4 are supplied to AND gate 502. These signals represent the $2^3$ and $2^4$ level outputs, respectively, of a counter which is counting the lines in the video signal to which the augmenting pulses produced by the circuit of FIG. 5 are to be added. At the 24th count, both of these signals admit of relatively high levels to enable the AND gate 502.

The output of AND gate 502 is supplied to OR gate 504. Consequently, when the output of AND gate 502 becomes high at the 24th count, the output of OR gate 504, which is the signal ALWSERR, becomes high.

The signal ALSWERR and the signal N-VUNCNT8 are supplied to AND gate 506. The signal N-VUNCNT8 represents the inverted $2^8$ level output of the same counter which supplies the signals VUNCNT3 and VUNCNT4, and is high until the 256th count is reached. Thus, between counts 24 and 255, both inputs to AND gate 506 are high, so that the output of AND gate 506 is latched high. At count 256, the signal N-VUNCNT8 undergoes a transition to a low level, at which time the signals VUNCNT3 and VUNCNT4 are also low, so that the signal ALWSERR undergoes a transition to a low level.

The signal ALWSERR and a signal HPULSE are supplied to AND gate 508. The signal HPULSE is high during each horizontal sync pulse interval of the video signal to which the augmenting pulses produced by the circuit of FIG. 5 are to be added. Therefore, the output of AND gate 508, which is the signal HPULSERR, is high during the horizontal sync pulse intervals of the 24th through 255th lines of the video signal. The signal HPULSERR is an activation signal, indicating that augmenting pulses are to be generated.

The signal HPULSERR and a CLOCK signal are supplied to flip flop 510. The CLOCK signal is a series of pulses at a frequency of 14.3 MHz, which is four times the frequency of the color burst. However, use of this particular frequency is not critical, and other frequencies are suitable. One clock pulse after the signal HPULSERR becomes high, the output of flip flop 510, which is the signal HPULSDL, undergoes a low-to-high transition. Also, immediately after the signal HPULSERR becomes low, HPULSDL undergoes a high-to-low transition.

The signal HPULSDL and the inverted output of flip flop 528 are supplied to AND gate 520. Initially, the Q output of flip flop 528, which is the signal NEWHORZ is at a low level, so the inverted output of flip flop 528 is high. Thus, when the signal HPULSDL becomes high, the output of AND gate 520, which is the signal N-NEWHORZ, also becomes high.

The signal N-NEWHORZ and the signal HPULSERR are supplied to counter 522 as load and clear signals, respectively. Signals A0–3, which represent the bits of a number used to control the width of each augmenting pulse, shown as "a" in FIG. 2, are also supplied to counter 522. The signals A0–A3 comprise a control signal which indicates the duration of each individual augmenting pulse. When the signal N-NEWHORZ is low, the number represented by the signals A0–A3 is loaded into counter 522. When the signal N-NEWHORZ is high, counter 522 counts from a preset value indicated by the signals A0–A3 to its maximum value. When the maximum count of counter 522 is reached, the count "rolls over" to produce a CARRY A output signal of high level. When the signal N-NEWHORZ is low, counter 522 is inactive.

The signal CARRY A is supplied to OR gate 526. When the signal CARRY A is produced, the output of OR gate 526 becomes high. The output of OR gate 526 is supplied to flip flop 528 to trigger the flip flop, whereupon the signal NEWHORZ, which is produced at the Q output of flip flop 528, changes state from low to high, and the signal N-NEWHORZ changes state from high to low. The signal NEWHORZ corresponds to the augmenting pulses, that is, the signal NEWHORZ is high during an augmenting pulse. The intervals when the signal NEWHORZ is low, which is when the signal N-NEWHORZ is high, correspond to the intervals between augmenting pulses having the duration "b" in FIG. 2.

The signal NEWHORZ and the signal HPULSDL are supplied to counter 524 as load and clear signals, respectively. The signal HPULSDL is used instead of the signal HPULSERR to compensate for the inherent circuit element delay of flip flop 528. Signals B0-B3, which represent the bits of a number used to control the width of the interval between augmenting pulses, shown as "b" in FIG. 2, are also supplied to counter 524. The signals B0-B3 comprise a suppression signal which indicates the duration between individual augmenting pulses. When the signal NEWHORZ is low, the number represented by the signals B0-B3 is loaded into counter 524. When the signal NEWHORZ is high, counter 524 counts from the preset value indicated by the signals B0-B3 to its maximum value. Like counter 522, when the maximum count of counter 524 is reached, the counter rolls over to produce a CARRY B output signal. When the signal NEWHORZ is low, counter 524 is inactive.

The signal CARRY B is also supplied to OR gate 526. When the signal CARRY B is produced, the output of OR gate 526 becomes high, causing flip flop 528 to again change state and invert each of the signals NEWHORZ and N-NEWHORZ.

The operation of the circuit shown in FIG. 5 to produce augmenting pulses will now be described using the timing diagrams shown in FIGS. 6A-6N.

Figure 6A:
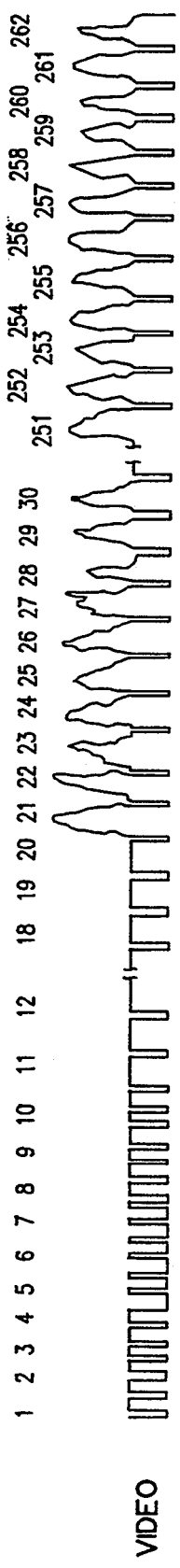
FIGS. 6A–6N are timing diagrams which are useful in explaining the operation of the circuit shown in FIG. 5.
Figure 6B:
Figure 6C:
Figure 6D:
Figure 6E:
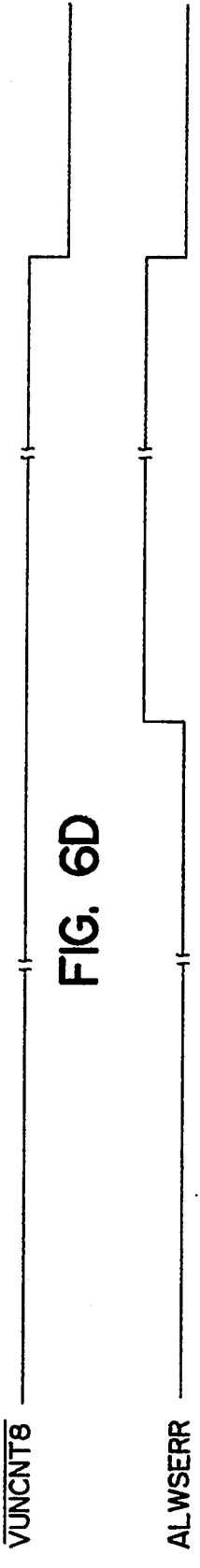
Figure 6F:
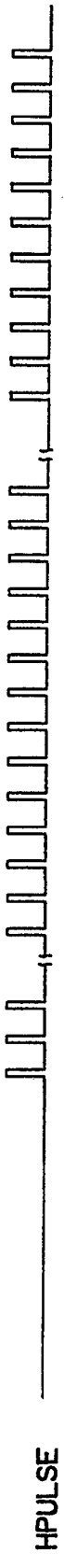

FIG. 6A shows one field of the video signal to which the augmenting pulses produced by the circuit of FIG. 5 are to be added. As can be seen from FIGS. 6B-6D, the signals VUNCNT3, VUNCNT4 and N-VUNCNT8, respectively, all are high at line 24 of the video signal. Consequently, the signal ALSWERR, shown in FIG. 6E, also becomes high beginning at line 24. The signal HPULSE, shown in FIG. 6F, is produced during each of the horizontal sync pulse intervals of the video signal. When the signals ALWSERR and HPULSE are combined in AND gate 508, the activation signal HPULSERR, which is shown in FIG. 6G, is latched during lines 24-255.

FIG. 6H shows two of the pulses of the signal HPULSERR of FIG. 6G using an expanded time scale. These pulses are delayed by flip flop 510, resulting in the signal HPULSDL which, as shown in FIG. 6J, goes high after a delay of one-clock pulse relative to the signal HPULSERR, and goes low with the signal HPULSERR. When the signal HPULSDL becomes high, AND gate 520 is enabled to produce the signal N-NEWHORZ, as shown in FIG. 6K, and counter 522 begins counting, as shown by the shaded portion of FIG. 6L. When the count of counter 522 reaches its maximum value, the signal CARRY A becomes high and flip flop 528 is triggered to produce an augmenting pulse of the signal NEWHORZ, as shown in FIG. 6N. While the signal NEWHORZ is high, counter 522 does not count and loads the value represented by the signals A0-A3.

After the signal CARRY A goes low, counter 524 is enabled by the signal. NEWHORZ and begins counting, as shown by the shaded portion of FIG. 6M. When the count of counter 524 reaches its maximum value, the signal CARRY B becomes high for one clock pulse. When the signal CARRY B next goes low, flip flop 528 is triggered once: again, whereupon the signal NEWHORZ goes low, and counter 522 again begins counting.

As can be seen from FIG. 6N, the signal NEWHORZ includes three augmenting pulses, each having a duration "a", during the duration of each of the pulses of the activation signal HPULSERR. The duration of each the pulses of the signal HPULSERR is equal to the horizontal sync pulse interval of the video signal. The interval between augmenting pulses has a duration "b". The duty cycle of the augmenting pulses, which is a function of the durations "a" and "b" changes when at least one of the durations "a" and "b" is changed. The second augmenting pulse is substantially equidistant from the adjacent augmenting pulses, namely, the first and third augmenting pulses.

The augmenting pulses in the signal NEWHORZ are logic level signals, and are converted to suitable analog level signals at the desired amplitude level using conventional amplifier circuitry. The augmenting pulses at the desired amplitude level are then superimposed upon the video signal so as to provide copy protection.

The present invention is readily combinable with other supplemental video signal copy protection techniques, such as those for modifying a video signal so that it can be satisfactorily displayed on a receiver but not satisfactorily recorded. A combination of protection techniques is substantially more effective than one technique. Supplemental copy protection techniques, described below, which are suitable for combination with the technique of the present invention include but are not limited to changing the duration of a field interval or adding a plurality of pseudo-sync pulses to the vertical blanking interval of each field.

U.S. Pat. No. 4,914,694, having a common assignee with the present invention, the disclosure of which is incorporated herein by reference, describes a technique for increasing or decreasing the duration of a field interval of a video signal by adding lines to, or deleting lines from, each field of the video signal. The vertical sync detecting circuitry in a typical television receiver operates correctly on such a modified signal, but the capstan and drum servo circuits in a typical VCR do not operate correctly, so copying is inhibited.

Another video signal modification technique comprises adding pairs of pseudo-sync pulses to lines in the vertical blanking interval not used for equalizing pulses, that is, lines 10-20 of a video field in NTSC format. The first pseudo-sync pulse of each pair is a negative pseudo-sync pulse having a duration of at least 0.5 microseconds and extending down to the sync tip level of the equalizing pulses, that is, an amplitude of approximately −40 IRE units. The second pseudo-sync pulse of each pair is a positive pseudo-sync pulse having a large amplitude which can be approximately equal to the peak white signal level of 100 IRE units. In practice, the amplitude of the positive pseudo-sync pulse is varied. A typical VCR loses sync when trying to record a video signal containing pseudo-sync pulses, since its AGC system cannot distinguish between an equalizing pulse and a pseudo-sync pulse.

The present invention may be applied to a video signal before it is recorded on a videocassette or video disc or other recording medium, or before it is broadcast. For videocassette recording, a high speed tape contact method, such as a mirror mother technique, may be used. Alternatively, a recording machine having recording circuits insensitive to the augmenting pulses so as to retain them in the recording may be used. It is known that different mastering systems will use variations in the durations "a" and "b".

Figure 7:
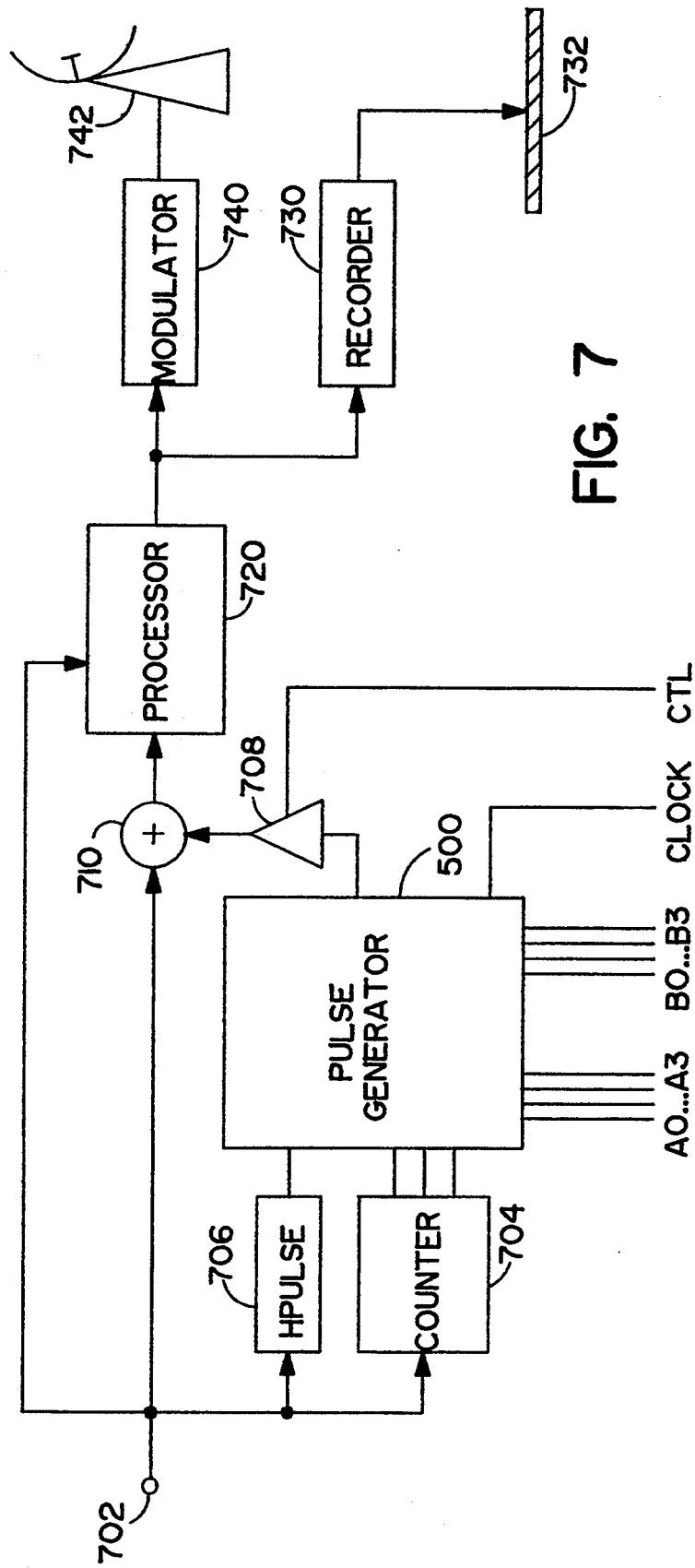
FIG. 7 is a block diagram illustrating a circuit which incorporates the circuit shown in FIG. 5.

FIG. 7 shows a circuit which produces a modified video signal that is protected by the copy protection technique of the present invention and another copy protection technique. The circuit of FIG. 7 includes an input terminal 702, a line counter 704, a horizontal sync pulse indicator 706, an augmenting pulse generator 500 (shown in greater detail in FIG. 5), an amplifier 708, an adder 710, a video processor 720, a recorder 730, a recording medium 732, a modulator 740 and a broadcasting facility 742.

The video signal to be copy protected is supplied to input terminal 702, and thence to line counter 704, horizontal sync pulse indicator 706, adder 710 and video processor 720.

The line counter 704 counts the lines of the video signal supplied thereto, and produces output signals representing the current line count. These output signals include the signals VUNCNT3, VUNCNT4 and N-VUNCNT8, discussed above with regard to FIG. 5.

The horizontal sync pulse indicator 706 produces an output signal HPULSE which is at a high level during the horizontal sync pulse intervals of the video signal supplied thereto. The HPULSE signal is discussed above with regard to FIG 5.

The output signals from the line counter 704 and horizontal sync pulse indicator 706, as well as the control signals A0–A3 and B0–B3, discussed above with regard to FIG. 5, are supplied to circuit 500, which, in response thereto, generates augmenting pulses. In particular, the output of circuit 500 is the signal NEWHORZ shown in FIG. 6N.

The signal NEWHORZ and an amplitude control signal CTL are supplied to amplifier 708. Amplifier 708 amplifies the signal NEWHORZ with a gain determined by the amplitude control signal CTL to produce an amplified signal.

The amplified signal from amplifier 708 is supplied to adder 710 which adds this amplified signal to the video signal to produce an augmented video signal, shown, for example, in FIG. 2. This augmented video signal can be satisfactorily displayed, but a copy of the reproduced augmented video signal cannot be satisfactorily displayed.

The augmented video signal is supplied to video processor 720 which modifies the augmented video signal using a supplemental copy protection technique, such as the above-described technique of changing the duration of a field interval or the above-described technique of adding a plurality of pseudo-sync pulses to the vertical blanking interval of each field. The modified video signal produced by video processor 720 is supplied to one or both of recorder 730 and modulator 740. Alternatively, the augmented video signal may be supplied from adder 710 directly to one or both of recorder 730 and modulator 740.

Recorder 730 records the modified video signal on a recording medium 732, which may be a magnetic tape, video disc or other recording medium.

Modulator 740 modulates the modified video signal, and supplies the modulated video signal to broadcasting facility 742 for broadcast, which may be via a cable system or via wireless transmission.

Alternatively, a video signal supplied to input terminal 702 can be supplied directly to recorder 730 and recorded on recording medium 732. Subsequently, this video signal can be supplied to horizontal sync pulse indicator 706 and counter 704, and the corresponding amplified signal from amplifier 708 supplied to recorder 730 for recording on the recording medium containing the previously recorded signal. Practically, this represents adding augmenting pulses to a pre-recorded signal.

Although illustrative embodiments of the present invention, and various modifications thereof, have been described in detail herein with reference to the accompanying drawings, it is to be understood that the present invention is not limited to these precise embodiments and the described modifications, and that various changes and further modifications may be effected therein by one skilled in the art without departing from the scope or spirit of the invention as defined in the appended claims.

What is claimed is:

1. A method for copy protecting a video signal comprising the steps of:
   providing a video signal including field intervals of video information and horizontal synchronizing intervals each having a horizontal sync pulse therein with a predetermined magnitude, and
   adding a plurality of augmenting pulses having a magnitude substantially greater than said predetermined magnitude to at least one of the horizontal sync pulses in each of said field intervals to produce a modified video signal which can be displayed with an absence of distortion that would otherwise be caused by the presence of said augmenting pulses.

2. A method as in claim 1, wherein said step of adding includes positioning at least one of said augmenting pulses to be substantially equidistant from adjacent augmenting pulses.

3. A method as in claim 1, wherein three augmenting pulses are added to said at least one synchronizing interval.

4. A method as in claim 1, wherein each horizontal sync pulse includes a former half and a latter half, and wherein said augmenting pulses are added to the latter half of said horizontal sync pulse.

5. A method as in claim 1, wherein said augmenting pulses exhibit a pulse width in the range 0.2 to 1.4 microseconds.

6. A method as in claim 1, further comprising the step of changing the magnitude of said plurality of augmenting pulses at preselected times.

7. A method as in claim 1, wherein said plurality of augmenting pulses has a duty cycle value, and further comprising the step of changing said duty cycle value at predetermined times.

8. A method as in claim 1, wherein each of said plurality of augmenting pulses has a duty cycle value, and further comprising the step of changing said duty cycle value of at least one of said augmenting pulses in said plurality.

9. A method as in claim 1, wherein each of said field intervals includes lines devoid of video information and lines containing video information, and wherein said plurality of pulses are added to the horizontal sync pulses of substantially all of said lines containing video information.

10. A method as in claim 1, further comprising the step of applying supplemental copy protection to the video signal to which augmenting pulses are added.

11. A method as in claim 10, wherein said step of applying supplemental copy protection comprises the steps of:
   increasing above a standard number of horizontal line intervals normally included in a frame the number of horizontal line intervals included in a first predetermined number of frames of the video signal to which augmenting pulses are added; and decreasing below said standard number the number of horizontal line intervals included in a second predetermined number of frames of said video signal to which augmenting pulses are added.

12. A method as in claim 11, further comprising the step of broadcasting the video signal to which augmenting pulses are added and supplemental copy protection is applied.

13. A method as in claim 11, further comprising the step of recording on a recording medium the video signal to which augmenting pulses are added and supplemental copy protection is applied.

14. A method as in claim 10, wherein said video signal also includes a vertical blanking interval in each of said field intervals and wherein said step of applying supplemental copy protection comprises adding a plurality of negative pseudo-sync pulse and positive pseudo-sync pulse pairs to said vertical blanking interval.

15. A method as in claim 14, further comprising the step of broadcasting the video signal to which augmenting pulses are added and supplemental copy protection is applied.

16. A method as in claim 14, further comprising the step of recording on a recording medium the video signal to which augmenting pulses are added and supplemental copy protection is applied.

17. A method as in claim 1, further comprising the step of broadcasting the video signal to which augmenting pulses are added.

18. A method as in claim 1, further comprising the step of recording on a recording medium the video signal to which augmenting pulses are added.

19. A method as in claim 18, wherein said recording medium is a magnetic tape.

20. A method as in claim 18, wherein said recording medium is a video disc.

21. A method as in claim 1, further comprising the step of recording said video signal on a recording medium, and wherein the step of adding said plurality of augmenting pulses includes a step of recording said plurality of augmenting pulses on said recording medium in at least one of the horizontal sync pulses of the video signal recorded on said recording medium.

22. A method as in claim 1, further comprising the step of generating said augmenting pulses.

23. A method as in claim 22, wherein said step of generating said augmenting pulses includes: generating an activation signal in response to said synchronizing intervals of said video signal, receiving a control signal which indicates a duration, and generating individual pulses having said duration in response to said control signal and said activation signal.

24. A method as in claim 23, wherein said step of generating said augmenting pulses further includes receiving a suppression signal which indicates a second duration, and wherein the generating of individual pulses is suppressed for a time equal to said second duration in response to said suppression signal.

25. An apparatus for copy protecting a video signal, said apparatus comprising:
means for receiving a video signal including field intervals of video information and horizontal synchronizing intervals each having a horizontal sync pulse therein with a predetermined magnitude, and
means for adding a plurality of augmenting pulses having a magnitude substantially greater than said predetermined magnitude to at least one of the horizontal sync pulses in each of said field intervals to produce a modified video signal which can be displayed with an absence of distortion that would otherwise be caused by the presence of said augmenting pulses.

26. An apparatus as in claim 25, wherein said means for adding includes means for positioning at least one of said augmenting pulses to be substantially equidistant from adjacent augmenting pulses.

27. An apparatus as in claim 25, wherein three augmenting pulses are added to said at least one synchronizing interval.

28. An apparatus as in claim 25, wherein each horizontal sync pulse includes a former half and a latter half, and wherein said augmenting pulses are added to the latter half of said horizontal sync pulse.

29. An apparatus as in claim 25, wherein said augmenting pulses exhibit a pulse width in the range 0.2 to 1.4 microseconds.

30. An apparatus as in claim 25, further comprising means for changing the magnitude of said plurality of augmenting pulses at preselected times.

31. An apparatus as in claim 25, wherein said plurality of augmenting pulses has a duty cycle value, and further comprising means for changing said duty cycle value at predetermined times.

32. An apparatus as in claim 25, wherein each of said plurality of augmenting pulses has a duty cycle value, and further comprising means for changing said duty cycle value of at least one of said augmenting pulses in said plurality.

33. An apparatus as in claim 25, wherein each of said field intervals includes lines devoid of video information and lines containing video information, and wherein said plurality of pulses are added to the horizontal sync pulses of substantially all of said lines containing video information.

34. An apparatus as in claim 25, further comprising means for applying supplemental copy protection to the video signal to which augmenting pulses are added.

35. An apparatus as in claim 34, wherein said means for applying supplemental copy protection includes:
means for increasing above a standard number of horizontal line intervals normally included in a frame the number of horizontal line intervals included in a first predetermined number of frames of the video signal to which augmenting pulses are added; and
means for decreasing below said standard number the number of horizontal line intervals included in a second predetermined number of frames of said video signal to which augmenting pulses are added.

36. An apparatus as in claim 35, further comprising means for broadcasting the video signal to which augmenting pulses are added and supplemental copy protection is applied.

37. An apparatus as in claim 35, further comprising means for recording on a recording medium the video signal to which augmenting pulses are added and supplemental copy protection is applied.

38. An apparatus as in claim 34, wherein said video signal also includes a vertical blanking interval in each of said field intervals and wherein said means for applying supplemental copy protection includes means for adding a plurality of negative pseudo-sync pulse and positive pseudo-sync pulse pairs to said vertical blanking interval.

39. An apparatus as in claim 38, further comprising means for broadcasting the video signal to which augmenting pulses are added and supplemental copy protection is applied.

40. An apparatus as in claim 38, further comprising means for recording on a recording medium the video signal to which augmenting pulses are added and supplemental copy protection is applied.

41. An apparatus as in claim 25, further comprising means for broadcasting the video signal to which augmenting pulses are added.

42. An apparatus as in claim 25, further comprising means for recording on a recording medium the video signal to which augmenting pulses are added.

43. An apparatus as in claim 42, wherein said recording medium is a magnetic tape.

44. An apparatus as in claim 42, wherein said recording medium is a video disc.

45. An apparatus as in claim 25, further comprising means for recording said video signal on a recording medium, and wherein said means for adding said plurality of augmenting pulses includes means for recording said plurality of augmenting pulses on said recording medium in at least one of the horizontal sync pulses of the video signal recorded on said recording medium.

46. An apparatus as in claim 25, further comprising means for generating said augmenting pulses.

47. An apparatus as in claim 46, wherein said means for generating said augmenting pulses includes: means for generating an activation signal in response to said synchronizing intervals of said video signal, means for receiving a control signal which indicates a duration, and means for generating individual pulses having said duration in response to said control signal and said activation signal.

48. An apparatus as in claim 47, wherein said means for generating said augmenting pulses further includes means for receiving a suppression signal which indicates a second duration, and wherein said means for generating individual pulses suppresses generation of each of said individual pulses for a time equal to said second duration in response to said suppression signal.

* * * * *